United States Patent [19]

Hall et al.

[11] 3,954,952

[45] May 4, 1976

[54] CONTINUOUS CHEMICAL PROCESS FOR THE MANUFACTURE OF SODIUM AND POTASSIUM PEROXYDISULFATE

[75] Inventors: Richard E. Hall, Trenton; Sushil K. Bhalla, Princeton; Michael J. McCarthy, Fanwood, all of N.J.

[73] Assignee: FMC Corporation, Philadelphia, Pa.

[22] Filed: Mar. 24, 1975

[21] Appl. No.: 560,762

[52] U.S. Cl. .............................................. 423/513
[51] Int. Cl.$^2$ ......................................... C01B 15/08
[58] Field of Search ........................... 423/511–513

[56] References Cited
UNITED STATES PATENTS

| | | | |
|---|---|---|---|
| 2,899,272 | 8/1959 | Flach et al. | 423/513 |
| 3,227,517 | 1/1966 | Leaver et al. | 423/513 |
| 3,351,426 | 11/1967 | Leaver et al. | 423/513 |
| 3,716,629 | 2/1973 | Miller | 423/513 |

FOREIGN PATENTS OR APPLICATIONS

| | | | |
|---|---|---|---|
| 77,340 | 1/1894 | Germany | 423/513 |
| 220,202 | 3/1942 | Switzerland | 423/513 |
| 871,432 | 4/1942 | France | 423/513 |
| 724,945 | 9/1942 | Germany | 423/513 |
| 943,041 | 11/1949 | France | 423/513 |
| 1,493,723 | 9/1967 | France | 423/513 |

*Primary Examiner*—Earl C. Thomas

[57] ABSTRACT

A process for the production of sodium and potassium peroxydisulfates by continuously reacting a 10 to 75 weight percent solution of the corresponding sodium or potassium hydroxide with a 20 to 70 weight percent solution or slurry of ammonium peroxydisulfate, at a temperature between 15° and 45°C and at a pH between 11 and 13. Air or an inert gas is passed through the reaction medium to remove ammonia and the product is recovered by conventional means, preferably by spray drying.

9 Claims, 2 Drawing Figures

FLOW DIAGRAM FOR THE MANUFACTURE OF SODIUM PERSULFATE (EXAMPLES 1-4)

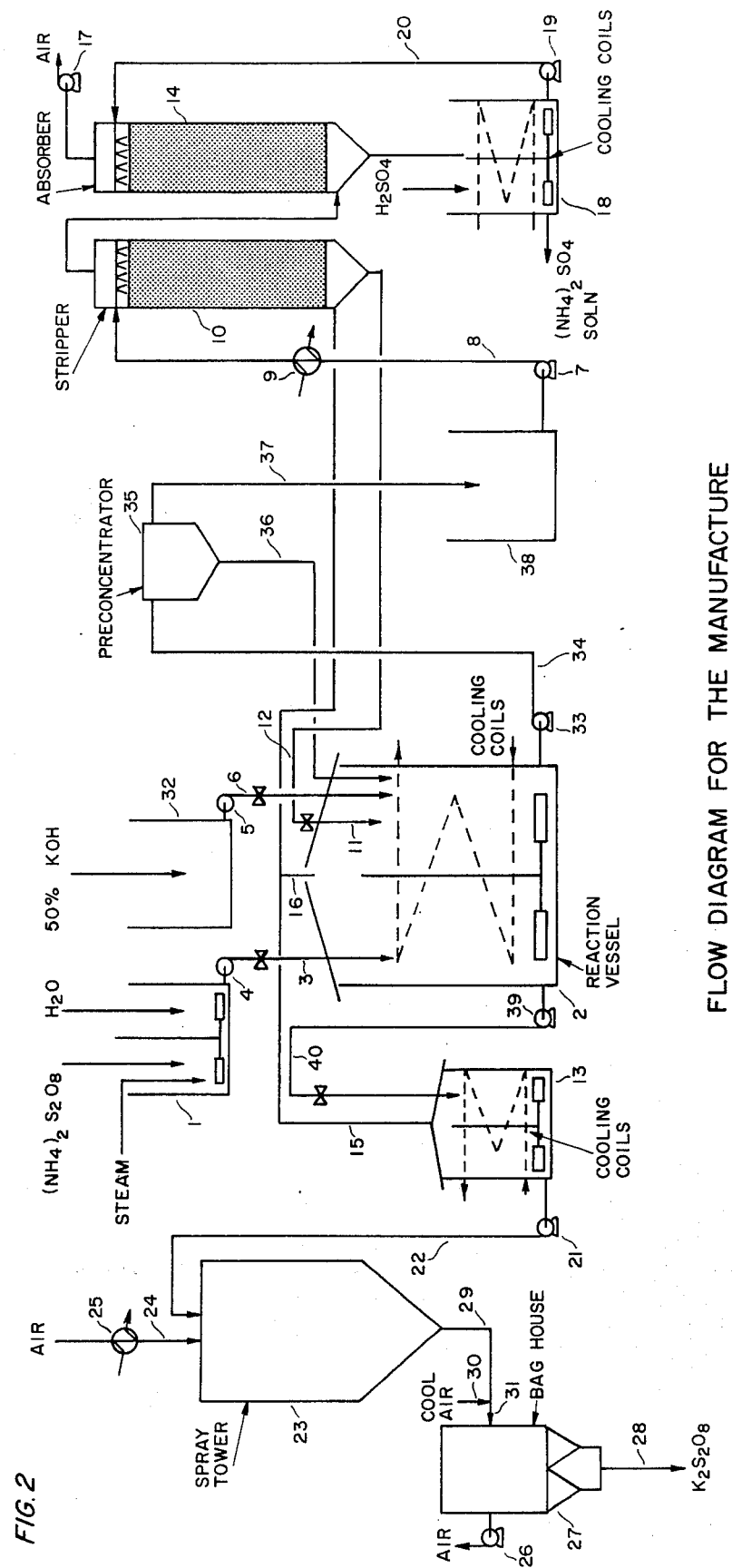

CONTINUOUS CHEMICAL PROCESS FOR THE MANUFACTURE OF SODIUM AND POTASSIUM PEROXYDISULFATE

This invention relates to a continuous improved chemical process for the manufacture of sodium or potassium peroxydisulfate from ammonium peroxydisulfate.

The chemical formation of alkali metal salts of peroxydisulfuric acid, particularly sodium peroxydisulfate and potassium peroxydisulfate, by the reaction of ammonium peroxydisulfate with aqueous solutions of corresponding alkali metal hydroxides or carbonates is known. Although this reaction is generally well known, considerable difficulties in manufacturing operations have occurred because these salts are very soluble in water, crystallize into fine crystals which are difficult to recover from solution, often decompose with loss of active oxygen during recovery processes, and the reaction releases ammonia gas, which can combine with oxygen in the air or from peroxydisulfate decomposition to form dangerous, explosive gas mixtures.

A process to produce alkali metal and alkaline earth peroxydisulfates from ammonium peroxydisulfate in a vacuum crystallizer was disclosed by D. O. Flach and R. E. Garver in U.S. Pat. No. 2,899,272. The disclosed process reacts aqueous solutions of ammonium peroxydisulfate and the appropriate alkali metal or alkaline earth hydroxide or carbonate at temperatures between 0° and 45°C at a pressure of about 5 to 90 mm. of mercury (absolute) and at such a rate that the ammonium ion concentration does not exceed 60 grams per liter when expressed as ammonium sulfate. Ammonia is removed from the reaction zone by vacuum stripping.

A process of producing alkali peroxydisulfate from ammonium peroxydisulfate disclosed in U.S. Pat. No. 2,899,272 removes ammonia and water by vacuum stripping. This maintains a low ammonia level but the reaction solutions are held for over 24 hours in a crystallizer to provide time for the crystals to grow and the water and ammonia to be removed. This long residence time is a disadvantage because it allows the peroxydisulfate to hydrolyze and to react with ammonia to produce the corresponding alkali sulfate. The sulfate levels will build up in the crystallizer mother liquor because the mother liquor is recycled. Eventually, alkali sulfate will precipitate with the peroxydisulfate or the alkali sulfate must be removed from the mother liquor, or, if permitted, the liquor must be discarded.

The reaction of sodium hydroxide or sodium carbonate with ammonium peroxydisulfate in a saturated sodium peroxydisulfate solution to produce sodium peroxydisulfate at temperatures of 15° to 25°C with the removal of ammonia and water formed during the process effected by passing air through the reaction solution is disclosed by J. P. Zumbrunn in French Pat. No. 1,493,723. This patent discloses that sodium sulfate builds up in the recirculated mother liquor and after 24 to 30 cycles is removed by cooling; the patentee partially controls loss of active oxygen, that is, the part due to hydrolysis, by maintaining reaction temperatures at 15° to 25°C. Nevertheless, active oxygen is lost when the peroxydisulfate reacts with ammonia to produce sulfate and nitrogen gas. This loss of active oxygen and the periodic purification of the mother liquor add to the cost of the product of this process.

In accordance with the present invention, there is provided a process for the production of sodium or potassium peroxydisulfates by continuously reacting a solution of the corresponding sodium or potassium hydroxide with a solution or slurry of ammonium peroxydisulfate. The sodium or potassium hydroxide solution concentration is between 10 and 75 weight percent with a preferred concentration being about 50%. The ammonium peroxydisulfate solution or slurry contains 20 to 70 weight percent and preferably about 40 weight percent ammonium peroxydisulfate. The reaction temperatures are maintained between 15° and 45°C, preferably between 25° and 35°C at atmospheric pressure. The reaction is conducted in the pH range of 11 to 13, preferably between 11.5 and 12 and the ammonia concentration in the reaction medium is kept low, for example, below 6 weight percent at 25°C, and air or an inert gas is passed through the reaction medium or the reaction mixture is passed through a countercurrent gas stripping column to remove ammonia. Preferably, the ammonia concentration in the reaction medium is maintained below about 1 weight percent and most preferably below 0.5 weight percent. In the reaction system of this invention, about 36% of the total ammonia and ammonium ion concentration in the reaction solution was present as ammonia at a pH of 9 and at a temperature of 25°C, 65% was present as ammonia at a pH of 9.5 and 85% as ammonia at a pH of 10. The product is recovered from the reaction mixture by conventional means and preferably by spray drying.

The aqueous sodium and potassium hydroxide solutions are employed in concentrations of from 10 to 75 weight percent with a preferred concentration being about 50%. Higher concentrations are difficult to handle because they must be heated to prevent crystallization of the sodium or potassium hydroxide salts and the use of more dilute solutions requires the removal of larger amounts of water from the corresponding peroxydisulfate product. The ammonium peroxydisulfate solution or slurry should contain 20 to 70 weight percent, preferably about 40 weight percent ammonium peroxydisulfate. The reaction of the sodium or potassium hydroxide with ammonium peroxydisulfate to produce the corresponding alkali peroxydisulfate is essentially instantaneous. The reactants feed rates and concentrations are selected so that the reaction medium is maintained in the pH range of 11 to 13, preferably 11.5 to 12 to insure that most of the ammonium ions are converted to ammonia. The ammonia concentration must be kept low, for example, below 6 weight percent in solution at 25°C, to avoid the formation of explosive mixtures with oxygen containing gases, generally air. Preferably, the ammonia concentration is maintained below about 1 weight percent and most preferably below about 0.5 weight percent in order to control the undesired side reaction of the ammonia with the peroxydisulfate which results in loss of active oxygen from the peroxydisulfates. The ammonia concentration in the solution is kept low by controlling the pH to convert ammonium ions to ammonia and removing ammonia by passing air or an inert gas through the reaction solution or passing the solution through a countercurrent gas stripping column.

The present reaction may be represented by the following general equation:

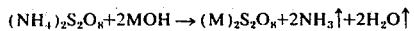

$(NH_4)_2S_2O_8 + 2MOH \rightarrow (M)_2S_2O_8 + 2NH_3\uparrow + 2H_2O\uparrow$ where M is sodium or potassium. The alkali metal hydroxide and ammonium persulfate are mixed together in substantially stoichiometric proportions. Although deviations from stoichiometric proportions are possible they are uneconomic and when spray drying is employed, the final product is contaminated.

The temperature at which the present reaction is conducted is between 15° and 45°C. It is important that the reaction be run at a temperature no higher than about 45°C, in order to avoid undue decomposition of peroxydisulfate, and it is important further that the reaction mixture be agitated vigorously to avoid creation of local hot spots in the reaction mixture.

The reaction between the ammonium persulfate and the desired hydroxide takes place substantially on contact. Operation of the present process therefore is limited timewise by the time required to establish contact between these ingredients, and largely by the time necessary to remove ammonia.

The process equipment and its arrangement is not critical to the present novel process. For example, the stripper is only one means for dispersing and passing a stripping gas through the reaction solution. A means as simple as passing the stripping gas through a properly designed sparger located well below the surface of the reaction solution can provide adequate stripping. The method of disposal of the ammonia and drying the product is optional; drying can be effected by conventional means but spray drying is preferred. Conventional particle collection equipment is matched to the dryer, for example, spray drying produces very fine particles which are not separated readily by a cyclone separator so a fine particle separator such as a bag filter is used.

The alkali metal peroxydisulfate can be recovered from solution by the use of a variety of conventional equipment such as evaporative or cooling crystallizers, spray or film driers. A spray or film dryer is preferred as there is no recycle of the solution and therefore the problem of building up sodium or potassium sulfate solutions in the reaction liquor is avoided. Spray drying is especially preferred as the ammonia to oxygen ratio is low and the fire or explosion hazard is low.

The dry alkali metal peroxydisulfate product of this process has a purity of over 98% and less than 2% of the active oxygen content of the peroxydisulfate added as ammonium peroxydisulfate is lost during conversion of ammonium peroxydisulfate to sodium peroxydisulfate. The product contains less than 0.5% by weight of ammonium peroxydisulfate.

The following examples are provided to further illustrate this invention. The proportions in the examples and in the rest of the specification are by weight unless otherwise indicated and the temperatures are in degrees centigrade.

FIG. 2 is a flow sheet illustrating the production of potassium peroxydisulfate.

EXAMPLE I

Figure 1:
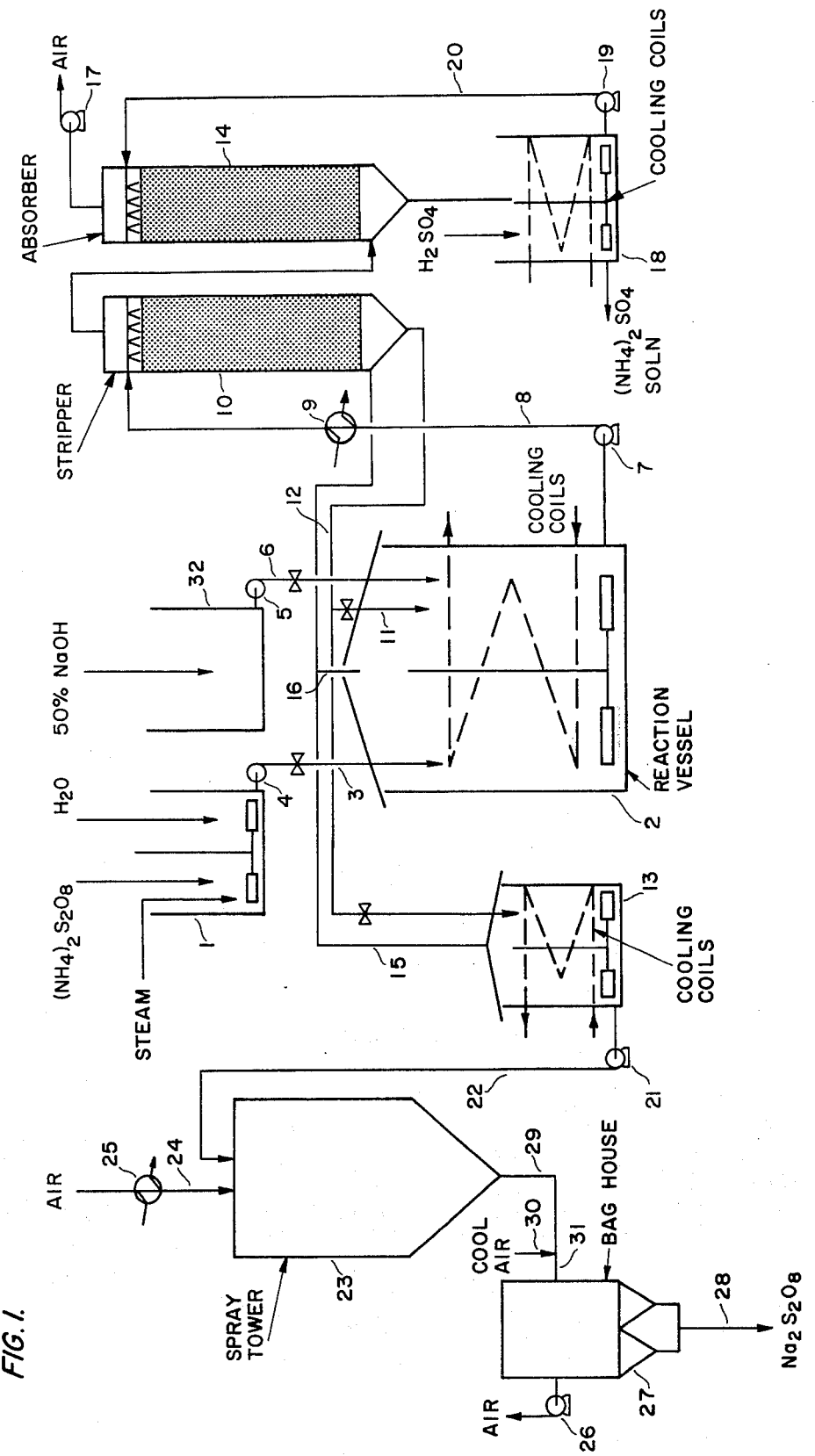
FIG. 1 is a flow sheet illustrating the production of sodium peroxydisulfate.

The procedure followed in the example is described with reference to the flow diagram of FIG. 1.

A 46.2 weight percent ammonium peroxydisulfate solution at 30°C from make up tank 1, FIG. 1, was fed continuously into an agitated 2,000 gallon reaction vessel 2 at the rate of 3.14 gallons per minute by way of line 3 and pump 4. Simultaneously a 50% sodium hydroxide solution was fed to vessel 2 from tank 32 through pump 5 and line 6 at a rate of 0.87 gallons per minute. Reaction vessel 2 was maintained at 25°C by passing cooling water through the coils in the tank. The pH of the solution in vessel 2 varied between 11.5 and 12.0. The solution from vessel 2 was pumped through heater 9 by pump 7 and line 8 where it was heated to 35°C before entering the countercurrent air stripper 10. The solution from the bottom of the stripper contained less than 0.5% ammonia. Part of it was diverted to feed tank 13 by way of line 12, which maintained a constant level in the feed tank, and the remainder was returned to the reaction vessel 2 by line 11. The air entering the bottom of stripper 10 and absorber 14 was drawn from over tanks 2 and 13 at the rate of 5,000 CFM through lines 15 and 16 by fan 17. The approximately 134 pounds per hour of ammonia in the air from stripper 10 was absorbed in sulfuric acid (during operation part of the sulfuric acid was converted to bisulfate) which is present in the solution in tank 18 which supplies solution to absorber 14 by pump 19 and line 20. The resulting ammonium sulfate solution was fed to ammonium persulfate cells for electrolysis to ammonium peroxydisulfate. The solution of peroxydisulfate solution from tank 13 was pumped into the spray dryer by pump 21 through line 22. The solution residence time averaged twelve hours. The air entering the spray dryer tower through line 24 and fan 26 was heated to 177°C by heater 25. The air and dry sodium peroxydisulfate exit the spray tower by line 29 at 77°C and the product was cooled by the addition of 9,200 CFM of 5°C air by line 30 before entering the baghouse 27 (a type of bag filter) by line 31. The solid sodium peroxydisulfate was removed from the baghouse 27 by line 28.

The resulting sodium peroxydisulfate had a purity greater than 98% with less than 1% of the active oxygen content of the ammonium peroxydisulfate being lost during conversion to sodium peroxydisulfate. The product contained less than 0.5% ammonium peroxydisulfate.

EXAMPLE II

Example I was repeated except that the residence time, the time the solution is held before drying, was increased from 12 hours to 24 hours, the ammonium peroxydisulfate feed rate was 1.5 gallons per minute and the sodium hydroxide feed rate was 0.44 gallons per minute. The remainder of the example was run as outlined in Example I. The resulting sodium peroxydisulfate had a purity of 97%; 2% of the active oxygen of the ammonium peroxydisulfate was lost during conversion to sodium peroxydisulfate.

EXAMPLE III

Example I was repeated except that the temperature of the reaction vessel 2 was increased to 37°C. The resulting sodium peroxydisulfate had a purity of 97% and 2% of the active oxygen content of the ammonium peroxydisulfate starting materials was lost during conversion to sodium persulfate.

EXAMPLE IV

The process of Example I was repeated except that the ammonia content of the solution from the bottom of the stripper 10 was maintained at 2% by reducing the air flow to the stripper. The remainder of the example was conducted as outlined in Example I. The resulting sodium peroxydisulfate had a purity of 97%; 2% of the active oxygen content of the starting ammonium peroxydisulfate solution was lost during conversion to the sodium peroxydisulfate.

EXAMPLE V

The production of potassium peroxydisulfate from ammonium peroxydisulfate is recited with reference to the flow diagram for the manufacture of potassium peroxydisulfate of FIG. 2.

A 42.6 weight percent ammonium peroxydisulfate solution at 30°C from make up tank 1, FIG. 2, was fed continuously into an agitated 2,000 gallon reaction vessel 2 at the rate of 3.14 gallons per minute by way of line 3 and pump 4. Simultaneously a 50% potassium hydroxide solution was fed to vessel 2 from tank 32 through pump 5 and line 6 at a rate of 1.08 gallons per minute. Reaction vessel 2 was maintained at 25°C by passing cooling water through the coils in the tank and the solution pH was maintained between 11.5 and 12.0. The slurry from vessel 2 was pumped through line 34 by pump 33 to preconcentrator 35 where the solids were separated from the solution. The solids were returned to vessel 2 by line 36 and the clear solution enters tank 38 by line 37. The solution from tank 38 was pumped through heater 9 by pump 7 and line 8 where it was heated to 35°C before entering the countercurrent air stripper 10. The solution from the bottom of the stripper containing less than 0.5% ammonia was returned to vessel 2 by line 12.

The air entering the bottom of stripper 10 and absorber 14 was drawn from over tanks 2 and 13 at the rate of 5,000 CFM through lines 15 and 16 by fan 17. The ammonia, averaging 134 pounds per hour in the air from stripper 10 was absorbed in sulfuric acid solution in tank 18 which supplies solution to absorber 14 by pump 19 and line 20. The resulting ammonium sulfate solution was fed to ammonium peroxydisulfate cells for electrolysis to ammonium persulfate.

The potassium peroxydisulfate slurry from vessel 2 was pumped to spray dryer feed tank 13 by pump 39 and line 40. The slurry was then pumped from tank 13 into the spray dryer 23 by pump 21 through line 22. Air entering the spray dryer tower through line 24 and fan 26 was heated to 177°C by heater 25. The air and dry potassium persulfate were removed from spray dryer by line 29 at 77°C and cooled by the addition of 9,200 CFM of 5°C air by line 30 before entering the baghouse 27 by line 31. The solid potassium peroxydisulfate was removed from the baghouse 27 by line 28.

The resulting potassium peroxydisulfate had a purity greater than 99% with less than 1% of the active oxygen content of the ammonium peroxydisulfate lost during conversion to potassium peroxydisulfate.

What is claimed is:

1. In the production of an alkali metal peroxydisulfate, in an aqueous medium, by the reaction of ammonium peroxydisulfate and a hydroxide of sodium or potassium at a temperature of 0° to 45°C, the improvement which comprises continuously mixing ammonium peroxydisulfate and an alkali metal hydroxide together in substantially stoichiometric proportions at a temperature of about 15° to 45°C, pH in the range of 11 to 13, maintaining the ammonia concentration in the reaction medium below 6 weight percent based on the weight of the reaction medium, by removing ammonia by passing air or an inert gas through the reaction solution, and recovering the product.

2. The process of claim 1 in which the sodium or potassium hydroxide solution concentration is between 10 and 75 weight percent.

3. The process of claim 1 in which the ammonium peroxydisulfate solution or slurry concentration is 20 to 70 weight percent.

4. The process of claim 1 in which the reaction temperature is maintained between 25° and 35°C.

5. The process of claim 1 in which the reaction is conducted in the pH range between 11.5 and 12.

6. The process of claim 1 in which the ammonia concentration in the reaction solution is maintained below 0.5 weight percent.

7. The process of claim 1 in which the product is recovered by spray drying.

8. The process of claim 1 in which the residence time is less than 24 hours.

9. The process of claim 1 in which the ammonia is removed in a countercurrent gas stripper.

* * * * *